United States Patent Office 3,182,048
Patented May 4, 1965

3,182,048
METAL OXIDE POLYMERIZATION CATALYSTS
Iver W. Mills, Glenolden, Pa., assignor to Sun Oil Company, Philadelphia, Pa., a corporation of New Jersey
No Drawing. Filed Aug. 11, 1960, Ser. No. 48,855
12 Claims. (Cl. 260—93.7)

This invention relates to methods of preparing metal oxide catalysts, and particularly relates to the preparation of catalysts at low temperatures for use in the preparation of solid polymers.

This application is a continuation-in-part of my copending application Serial No. 692,248, filed October 25, 1957, now abandoned.

Catalysts comprising one or more metal oxides are used to promote polymerization. Often the active metal oxide is supported on a suitable carrier material or supporting material, such as alumina or bauxite. The preparation of such supported catalysts usually involves the addition of the active metal ingredient to the supporting material in the form of an aqueous solution of a salt which upon being heated in air, at a temperature of from 800° F. to 1200° F., decomposes to the desired metal oxide. In another conventional method, the active component is added to the support in the form of an aqueous solution and is then precipitated on or in the supporting material with an aqueous alkaline solution and the resulting supported metal hydrous oxide or hydroxide is dried at high temperatures. Still another commonly used method involves the formation of a cogel by combining aqueous solutions of the supporting material and a salt of the active metal ingredient and adding an alkaline solution thereto, and by subsequently drying the cogel at a temperature of 800° F. to 1200° F. to form the metal oxide deposited on the support. In some of the reactions promoted or catalyzed by metal oxides prepared by one of these methods, such as in polymerization, it is essential that the metal of the metal oxide be in its highest valence state i.e., a maximum valence state metal oxide. Hence, it is necessary that the high temperature heating in air be continued for a long enough period of time to insure that substantially all the metal is oxidized completely.

Such methods of forming the metal oxide catalysts have not been altogether satisfactory. High temperature heating is expensive, especially for such long periods of time as are required. Further, such high temperatures are often damaging to the support material, in that it causes glazing, with consequent conversion to inactive forms and loss of surface area. When used for polymerizing olefins to solid polymers, oxides prepared in this manner are difficult to remove from the solid polymer, because of their insolubility in acids and other solvents, which apparently is due to the crystalline form of the oxide.

It is an object of this invention to provide a process for preparing maximum valence oxides of metals such as are suitable for the promotion of the conversion of hydrocarbons, particularly the polymerization of olefins. Another object is to provide a process for preparing such oxides supported on a carrier, and in which the carrier cannot be damaged by high temperatures. A further object is to provide a process for preparing such oxides in a form which is readily soluble in dilute mineral acids. Other objects and their achievement in accordance with this invention will become apparent hereinafter.

According to an embodiment of this invention, an aqueous solution of a compound of the metal is used to impregnate the supporting material, and the solution and supporting material are then contacted with a strong oxidizing agent, such as ozone or hydrogen peroxide, at temperatures as low as 250° F. Precipitated hydrous oxides or hydrous oxide gels of the metal whose oxide is desired as the catalyst may similarly be oxidized, either with or without a supporting material.

Solid polymers of certain olefins may be prepared by contacting the olefin with one or more maximum valence state metal oxides, which may be supported on such materials as bauxite, alumina, silica-alumina, zirconium oxide, and thorium oxide, or mixtures thereof. The metal oxides used may be the maximum valence state oxide of a metal from Groups VIa and VIII of the Periodic Table, and vanadium and manganese. Solid particles of the catalyst are usually dispersed in an inert, liquid reaction medium, such as n-heptane or isooctane, and the olefin injected at a temperature of from 100° F. to 450° F., and a pressure of from atmospheric to 10,000 p.s.i.g. (pounds per square inch gauge). The polymers formed will vary from low molecular weight oils to solids having a molecular weight up to about 50,000 or higher. The exact nature of the product is determined by a large number of factors, such as the particular olefin being polymerized, the temperature used, the particular catalyst used, and the amount of catalyst used. When solid polymers are formed, particles of catalyst are embedded therein, and it has been a major problem to remove these catalyst particles, since the catalysts as previously prepared are relatively insoluble in acids and other solvents, and the polymer can be dissolved only with difficulty, in hot hydrocarbons. However, good results are obtained in fixed bed operation. When using fixed bed operation, the olefin, as a solution in an inert reaction medium such as a saturated hydrocarbon, is passed through the catalyst bed while maintaining polymerizing conditions. These conditions preferably include temperatures high enough to dissolve the polymer in the reaction medium as it is produced.

This invention is applicable to the polymerization of olefins containing a $CH_2=C<$ radical. The preferred olefins are aliphatic 1-olefins having up to and including 8 carbon atoms per molecule. Specifically, ethylene, propylene and butene are suitable examples.

The preferred metal oxide catalyst for polymerizing olefins is chromium trioxide on a silica-alumina support. However, the oxides of the other metals of Groups VIa and VIII are also effective. For example, ferric oxide, nickel trioxide, cobalt trioxide, molybdenum trioxide, uranium trioxide, and tungsten trioxide are effective catalysts.

According to the process of the invention, these metal oxides are prepared by heating a solid compound of the metal at temperatures of from 250° F. to 450° F. for a period of from 1 to 24 hours in contact with a highly active oxidizing material, such as hydrogen peroxide or ozone in order to convert the metal to its highest valence state without crystallizing the support material.

In an embodiment of the invention, bauxite, alumina, silica, silica-alumina, zirconium oxide, thorium oxide, or other suitable support materials, together with a salt of the metal, such as the nitrate or sulfate, in aqueous solution, are contacted with a basic material, such as ammonium hydroxide, so that a hydrogel of the two materials is formed. This hydrogel is either a hydrous oxide or a hydroxide of the metal and support material, and contains up to 90% or more of water. The hydrogel may then be heated in air at about 200° F. to 300° F. until it is dried to no more than 15% water content although such drying is not a necessary step. The remaining gel is contacted with an oxidizing agent such as ozone or hydrogen peroxide, either in gaseous phase or liquid phase, at a temperature of from about 250° F. to 450° F., for a period of from one to twenty-four hours, thereby converting the hydrous oxides or hydroxides to oxides at the maximum valence state of the metal, and substantially drying the resulting oxide. For some applications, it may then be desirable to form these supported metal oxides into pellets for easier uses, whereas for other applications, such as in polymerizing olefins, the finely divided material resulting from this process is in its most useful form.

In another embodiment, the metal oxide may be incorporated with the carrier by impregnating the carrier with a suitable solution of a salt or acid of the corresponding metal. For example, the carrier may be impregnated with an aqueous solution of chromic acid, chromic chloride, ammonium chromate, chromium nitrate, ammonium molybdate, or the similar compounds of other metals in accordance with the well known prior art processes. The resulting material may then be dried and the oxide formed in the manner previously described. Usually from about 1% to about 10% by weight of the metal oxide calculated as the metal is used.

In still another embodiment, a salt or acid of the metal whose oxide it is desired to form is added to the support in aqueous solution, and then precipitated on or in the supporting material with an aqueous alkaline solution, and the resulting supported metal hydroxide or hydrous oxide is oxidized as described above.

When it is desirable to use a catalyst composed of two or more metal oxides, they may be prepared in the same manner as outlined above, and either with or without a supporting material.

Suitable metal oxide catalysts may also be prepared directly from a mineral containing the metal whose oxide is to be used. For example, bauxite is composed primarily of aluminum oxide, but also contains varying percentages of other materials, such as, for example, iron oxides. When substantially all the iron of bauxite is converted to ferric oxide by contacting it with the highly active oxidizing agents of this invention, at temperatures of 250° F. to 450° F., an excellent catalyst for polymerizing olefins is obtained. Minerals containing other metals and metal compounds may be similarly treated to convert the metals to their corresponding maximum valence oxides.

When the metal oxides of this invention have been used to promote or catalyze chemical reactions, it is usually necessary to reactivate them, since they usually become fouled or otherwise deactivated during use. The process of this invention may then be used to reactivate the catalyst so that it may be used again. For example, when ferric oxide supported on bauxite is used to promote the formation of solid polymers from olefins, the particles of catalyst become embedded in the solid polymer. The polymer is then ground or otherwise comminuted to expose the embedded catalyst, and the catalyst dissolved and washed out with a dilute mineral acid, such as nitric acid. The catalyst may then be reformed and activated by drying and heating in the presence of the oxidizing agents of this invention, as hereinbefore described.

Metal oxides as formed by previous methods could not satisfactorily be so removed from solid polymer, since such oxides are very difficult to dissolve. Apparently, this is due to the high temperatures used which cause the formation of a very hard, glazed form of the oxides which cannot easily be dissolved. The metal oxides of the present invention are in a finely divided active crystalline form and are soluble in dilute acids.

In the specific embodiment of the invention, it was desired to make a chromium trioxide catalyst supported on a silica-alumina support for use in polymerizing olefins.

*Example I*

A solution of 10 grams of chromic chloride ($CrCl_3 \cdot 6H_2O$) in one liter of water was prepared. To this solution, 67 grams of finely divided (10–200 mesh) silica-alumina were added. Ten grams of 50% ammonium hydroxide were added whereupon a chromic hydroxide precipitate formed on the silica-alumina particles. The water was then evaporated off at a temperature of 200° F. for 24 hours, and then the remaining silica-alumina particles with the chromic hydroxide precipitate was heated in air to 1000° F. for 20 hours. The resulting material consisted of 3% by weight of hexavalent chromium oxide, calculated as chromium, on a silica-alumina support.

This material was then used as a catalyst to polymerize propylene.

*Example II*

In a three-liter, glass-lined autoclave equipped with a mechanical agitator, there was placed one liter of 2,2,4-trimethylpentane and 50 grams of finely divided 3% $CrO_3$ on silica-alumina prepared by the method of Example I. The reactor was purged with oxygen-free dried nitrogen and 50 grams of propylene were added. The reactor was heated to 350° F. with stirring. The pressure of the reactor was about 225 p.s.i.g. Propylene was added incrementally whenever the pressure dropped to 200 p.s.i.g. The reaction was continued for a period of three hours during which time a total of 50 grams of propylene were added. The reactor was cooled to room temperature by venting the unreacted propylene. The product was a brown slurry in the isooctane solvent. In an attempt to remove the catalyst from the polymer, the polymerization product was contacted with an excess of 10% nitric acid. The catalyst was found to be insoluble in the acid.

*Example III*

A catalyst was prepared by the process of Example I, except that the silica-alumina particles containing the chromic hydroxide precipitate was contacted with ozone at 300° F. for 20 hours to form the hexavalent chromium oxide. This catalyst was used to polymerize propylene in a manner substantially the same as that shown in Example II. When the polymerization product was contacted with dilute nitric acid, substantially all of the catalyst was dissolved and removed from the polymer by washing. Thus, it can be seen that catalysts prepared by the method of the present invention are readily removed from olefin polymers by means of dilute acid treatment and it is no longer necessary to resort to dissolving the polymer in order to remove catalysts.

I claim:

1. A process for producing a solid polymer of an aliphatic 1-olefin having up to and including 8 carbon atoms per molecule which comprises contacting said olefin at polymerization conditions including temperatures ranging from 100° F. to 450° F. and pressures ranging from atmospheric to 10,000 p.s.i.g. with a catalyst comprising a supported metal oxide the metal being in its highest valence state and selected from the group consisting of the metals of Groups VIa and VIII of the Periodic Table and the support material being selected from the group consisting of bauxite, alumina, silica, silica-alumina, zirconia and thoria, said catalyst having been prepared by oxidizing a salt of the metal at a temperature in the range of from 250° F. to 450° F. for a time ranging from 1 to 24 hours with an oxidizing agent selected from the group consisting of hydrogen peroxide and ozone.

2. A process for preparing a supported metal oxide polymerization catalyst wherein the metal component is selected from the group consisting of the metals of Groups VIa and VIII of the Periodic Table which comprises contacting a salt of the metal on a support material selected from the group consisting of bauxite, alumina, silica, silica-alumina, zirconia and thoria with an oxidizing agent selected from the group consisting of hydrogen peroxide and ozone at a temperature in the range of from 250° F. to 450° F. for a time ranging from 1 to 24 hours whereby substantially all of the metal salt is converted to its maximum valence state oxide.

3. The process according to claim 1 in which the metal selected is chromium.

4. The process according to claim 1 in which the metal selected is iron.

5. The process according to claim 1 in which the metal selected is molybdenum.

6. The process according to claim 1 in which the metal selected is nickel.

7. The process according to claim 1 in which the oxidizing agent is ozone.

8. The process according to claim 1 in which the oxidizing agent is hydrogen peroxide.

9. The process according to claim 2 in which the metal selected is chromium.

10. The process according to claim 2 in which the metal selected is iron.

11. The process according to claim 2 in which the metal selected is molybdenum.

12. The process according to claim 2 in which the metal selected is nickel.

References Cited by the Examiner

UNITED STATES PATENTS

| | | | |
|---|---|---|---|
| 2,606,940 | 8/52 | Bailey et al. | 260—683.15 |
| 2,783,211 | 2/57 | McKinley | 252—455 |
| 2,825,721 | 3/58 | Hogan et al. | 260—94.9 XR |
| 2,881,233 | 4/59 | Clark | 260—683.15 |
| 2,888,497 | 5/59 | Pitzer | 250—94.9 XR |
| 2,949,429 | 8/60 | Bailey et al. | 252—472 |

JOSEPH L. SCHOFER, *Primary Examiner.*

J. GREENWALD, *Examiner.*